(12) United States Patent
Ramakrishnan et al.

(10) Patent No.: US 9,760,137 B2
(45) Date of Patent: Sep. 12, 2017

(54) PROGRAMMABLE SCALABLE VOLTAGE TRANSLATOR

(71) Applicant: Intel Corporation, Santa Clara, CA (US)

(72) Inventors: Siva Ramakrishnan, Beaverton, OR (US); Tod F. Schiff, Portland, OR (US); Sanjiv C. Soman, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 14/229,860

(22) Filed: Mar. 29, 2014

(65) Prior Publication Data

US 2015/0277544 A1    Oct. 1, 2015

(51) Int. Cl.
*G06F 1/26* (2006.01)
*G06F 1/32* (2006.01)

(52) U.S. Cl.
CPC ............ *G06F 1/26* (2013.01); *G06F 1/3243* (2013.01); *G06F 1/3287* (2013.01)

(58) Field of Classification Search
CPC ................................ G06F 1/26; G06F 1/3287
See application file for complete search history.

(56) References Cited

U.S. PATENT DOCUMENTS

| | | | | |
|---|---|---|---|---|
| 5,500,611 A | * | 3/1996 | Popat | H03K 19/01858 326/57 |
| 7,583,104 B2 | * | 9/2009 | Simmons | G06F 1/3203 326/82 |
| 8,513,979 B2 | * | 8/2013 | Lin | H03K 19/0008 327/18 |
| 2008/0082847 A1 | * | 4/2008 | Lee | G06F 1/3203 713/323 |
| 2009/0153211 A1 | * | 6/2009 | Hendin | G06F 1/3203 327/198 |
| 2009/0259864 A1 | * | 10/2009 | Li | G06F 1/3203 713/323 |
| 2010/0013518 A1 | * | 1/2010 | Theoduloz | H03K 19/01858 326/81 |

* cited by examiner

*Primary Examiner* — Stefan Stoynov
(74) *Attorney, Agent, or Firm* — Alpine Technology Law Group LLC

(57) ABSTRACT

Methods and apparatus relating to a programmable scalable voltage translator are described. In one embodiment, logic translates an input voltage level into a plurality of output voltage levels during a low power consumption state of a device. Other embodiments are also disclosed and claimed.

24 Claims, 5 Drawing Sheets

PROGRAMMABLE SCALABLE VOLTAGE TRANSLATOR

FIELD

The present disclosure generally relates to the field of electronics. More particularly, an embodiment relates to a programmable and/or scalable voltage translator.

BACKGROUND

To reduce power consumption and/or extend battery life, some mobile computing devices may utilize relatively lower operating voltage levels than legacy computing devices. However, the lower operating voltage levels may hinder support for some (e.g., legacy) communication interfaces.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
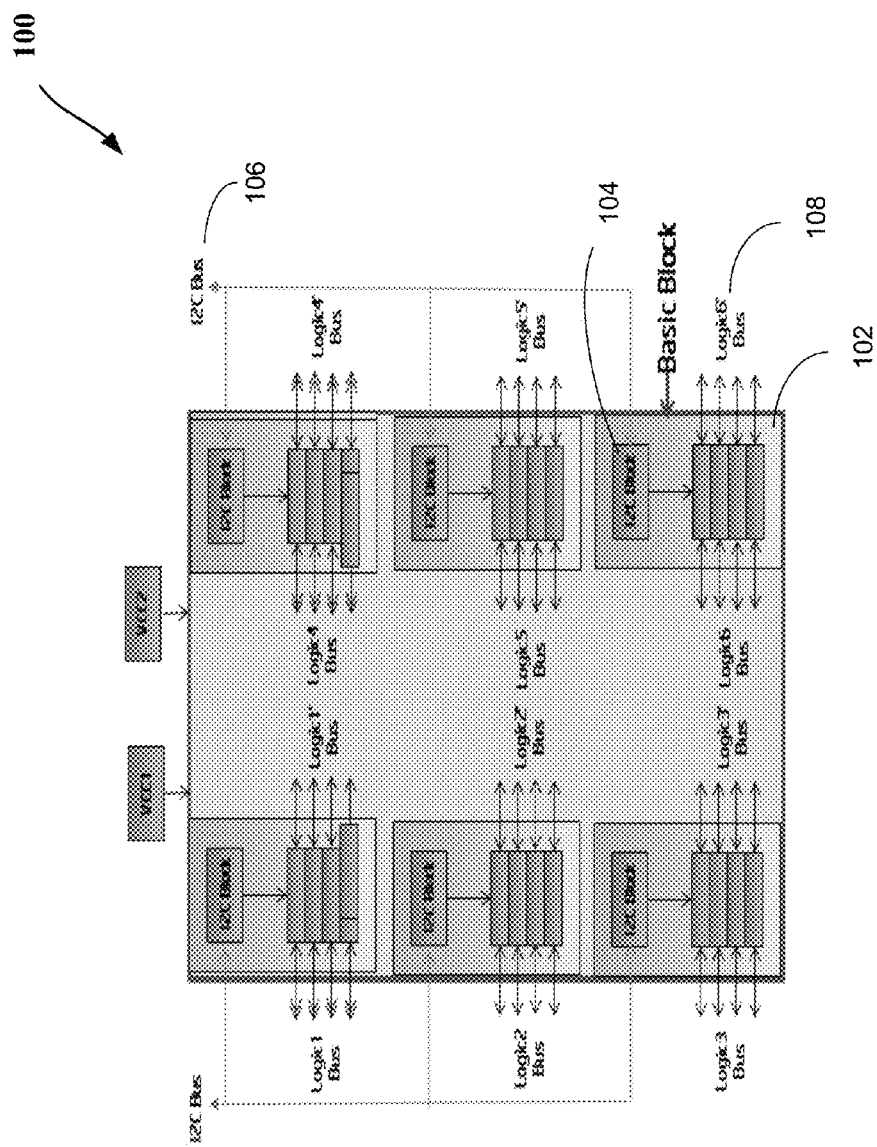
FIG. 1 illustrates a block diagram of a programmable and/or scalable voltage translator device, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As the computing industry moves towards SoC (System on Chip) designs, computing devices will migrate to a monolithic die option. This move to monolithic die helps reduce costs to be competitive. In addition, to being competitive, every milliWatt (mW) of idle, active power reduction becomes critically important. As a result, moving to monolithic die may require the elimination of support for high voltages on the die (e.g., voltage levels greater than 1.8V) in order to optimize the process for both power and performance. Supporting high voltage on the process imposes restrictions on the ability to optimize both power and performance.

One problem in eliminating high voltages from the die is that Personal Computer (PC) ecosystem has long had many peripheral devices which need to support high voltage legacy interfaces such as Universal Serial Bus (USB or later versions like USB2), SMBUS (System Management Bus), I2C (Interface to Communicate, which generally refers to a multi-master serial single-ended computer bus used for attaching low-speed peripherals to a motherboard, embedded system, cell phone, or other electronic device such as mobile computing devices) or simple devices that connect to GPIOs (General Purpose Input/Outputs), etc. Backward compatibility for some of these interfaces such as USB implies that these voltage requirements cannot be eliminated from the SoC without providing voltage translation on the board. The voltage translation is typically provided by level shifter ICs (Integrated Circuits) on the board. These level shifters are not voltage programmable, and hence the board requires many different flavors of level shifters which impose a significant BOM (Bill Of Material) cost on the platform. There is also the need to have different types of translators based on the input/output (IO) architecture of the bus (such as push-pull, passive pull-up, passive pull-down, bi-directional, etc) further adding to BOM cost and content. In addition, having many of these shifters adds significantly to standby (connected or otherwise) power and impacts platform compliance to strict standby power requirements.

To this end, some embodiments provide a programmable and/or scalable voltage translator. In an embodiment, a generic programmable/scalable low idle current voltage translator can be programmed to support different input/output voltage combinations as needed for different interface types. Moreover, such embodiments are agnostic to direction of voltage translation and/or type of IO architecture. In one embodiment, a programmable mechanism is provided to put a device in sleep or low current/power mode during connected standby. As discussed herein, "connected standby" generally refers to a state in which a computing device is in a lower power consumption state than an active state while still maintaining an active network connection, and where optionally the system may wake up periodically to execute one or more designated tasks). Furthermore, simple building blocks may be utilized, which can be scaled to cater to different platform segment needs.

Moreover, some embodiments may be applied in computing systems that include one or more processors (e.g., with one or more processor cores), such as those discussed with reference to FIGS. 1-5, including for example mobile computing devices such as a smartphone, tablet, UMPC (Ultra-Mobile Personal Computer), laptop computer, Ultrabook™ computing device, smart watch, smart glasses, wearable devices, etc. More particularly, FIG. 1 illustrates a block diagram of a programmable and/or scalable voltage translator device 100, according to an embodiment. FIG. 1 illustrates the overall architecture of a programmable/scalable voltage translator device, as well as a basic block.

As shown in FIG. 1, device 100 is coupled to one or more voltage rails (e.g., Vcc1 and Vcc2). Device 100 includes multiple copies of voltage translator basic logic blocks 102. This device 100 is capable of translating multiple voltage levels in either direction (i.e., up or down), although at least one use model would include about two or three voltage levels in either direction. Even though six basic logic blocks 102 are shown in FIG. 1, more or less basic logic blocks may be present depending on the implementation. Hence, device 100 is scalable in that the number of basic blocks in the device can be determined based on the platform segment, e.g., providing a pay as you go cost structure.

As illustrated in FIG. 1, each basic logic block 102 includes an I2C logic block 104 which may include programmable register(s) for setting key parameters. An I2C bus 106 couples the I2C programmable logic block on each basic block to the SoC or local controller such as an EMC (Embedded Memory Controller). SoC (or logic therein such as processors/cores discussed with reference to FIGS. 3-5) writes/reads to/from the registers on I2C block 104 to program the key parameters. In an embodiment, the bus 106 is shared among all the basic blocks in the device 100. In various embodiments, the programmable/key parameters include: (1) input/output voltage levels (which may include two or more input, output voltage levels); (2) passive or active pull-up output drive capability (e.g., to work with various types of bus structures); (3) adjustable "threshold" limits for detection of input (e.g., which may help detect low input current for auto sensing input connection); and/or (4) enable or low power mode signal that causes the corresponding block to enter a low power mode or sleep mode.

In an embodiment, each basic block 102 may support 4, 6, or 8 signals feeding into and out of the block (108). However, the precise number of signals per block can be determined based on the platform segment to which this device is deployed. Furthermore, each basic block may be capable of auto sensing input current and/or direction (i.e., up or down). Each basic block may be put into sleep or low power state for connected standby usage, e.g., by programming the low power mode on the I2C block 104. In one embodiment, if the input/output signals on the block are not connected or otherwise disconnected, the block may be disabled.

Figure 2:
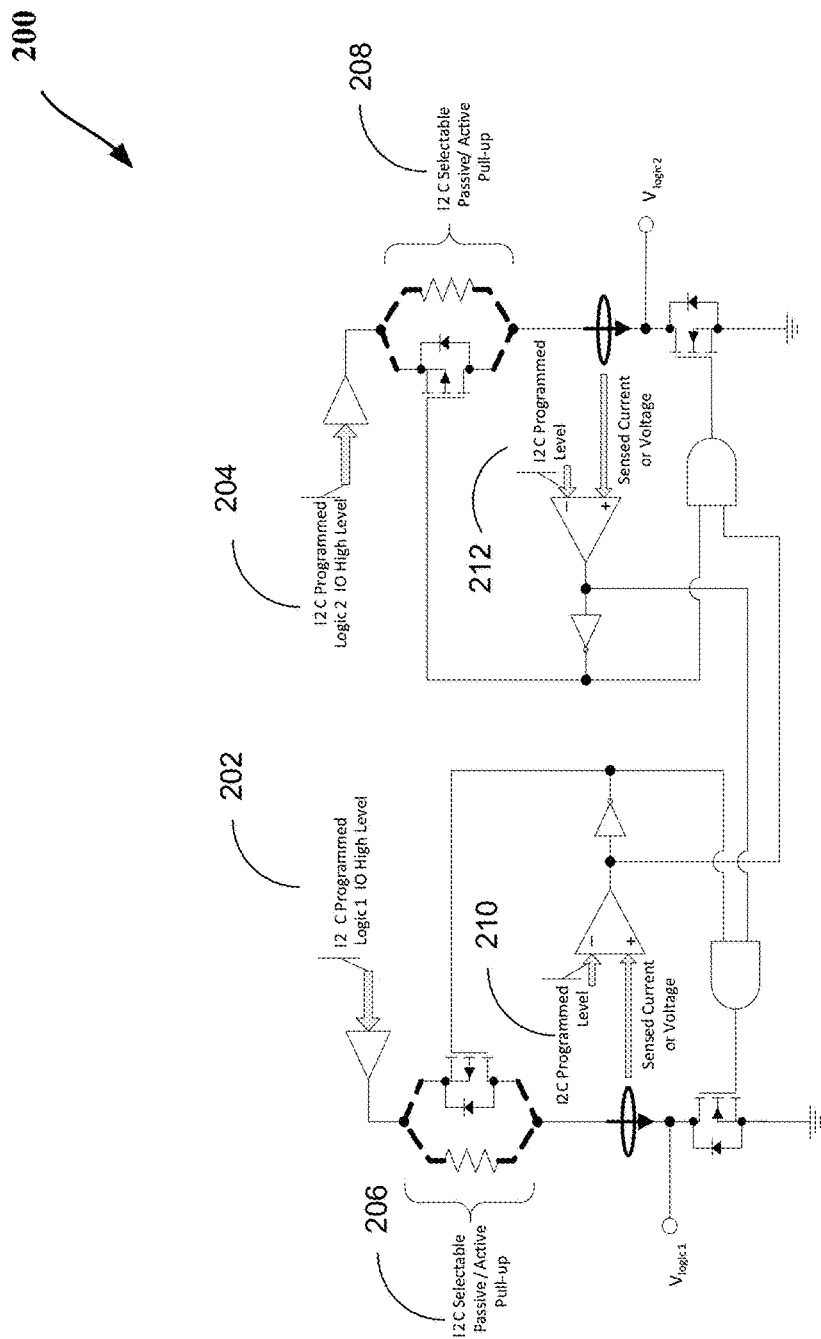
FIG. 2 illustrates a voltage translator circuitry, according to an embodiment.

FIG. 2 illustrates a voltage translator circuitry 200, according to an embodiment. In an embodiment, circuitry 200 may be used to implement the basic block 102 of FIG. 1. Further, circuitry 200 and/or device 100 may be used to support voltage levels (e.g., for voltage levels higher than 1.8V) for different (e.g., legacy) communication/peripheral interfaces like USB2, SMBUS, I2C, GPIOs, etc. As shown, circuitry 200 includes: (a) programmed logic IO HI voltage values for logic on either side 202/204 (that are coupled via a buffer to items 206/208); (b) programmable push/pull or passive pull up option 206/208 (which may include a parallel combination of a resistor and a transistor as shown); and/or (c) programmable threshold voltage or sensed current levels for logic on either side 210/212 (coupled to comparators with sensed current or voltage signals as shown).

In some embodiments, after the translator circuitry 200 is initialized, it is programmed (e.g., by the SoC or logic therein such as one or more processor/cores discussed with reference to FIGS. 3-5) to indicate the various parameters as discussed above. Once programmed, these parameters are not changed during runtime except for the low power mode signaling. When the device detects no connection to a particular block, the block is disabled. During connected standby, if the peripheral connected to a block is placed in standby mode then the voltage translation circuitry of the basic block is turned off or disabled. However, the basic block still retains the data in the I2C registers. Upon connected standby exit, the device exits low power or sleep mode and enables the basic block voltage translation circuitry.

By contrast, the problem may be currently solved by employing many different types of level shifters on the board. These shifters are generally not programmable and hence many different flavors of these are required on the board to cater to different input/output voltage needs of different interfaces like USB2, SMBUS, I2C and GPIOs. To this end, some embodiments provide: (a) an ability to program the input/output voltages for many different interfaces; (b) relatively simple building blocks which can be scaled to different platform segments as needed with different BOM cost; and/or (c) a programmable way to put the device to sleep/disable in standby mode.

Further, although some PMICs (Power Management ICs) may offer voltage regulation (such as ADC (Analog-to-Digital Conversion) or GPIO), they are primarily aimed at consolidating power rails and voltage regulators on the board into an IC. Some embodiments may be added into PMIC; however, since every signal of high voltage interfaces needs a voltage translation, adding voltage translation functionality to PMIC becomes a very pin count intensive and hence costly option for all platforms, in part, because PMICs are already substantial in both die size and package pin count. In addition, platforms which cannot work with a PMIC due to high current requirements on the rails will need a separate voltage translator IC anyway. To this end, some embodiments facilitate the move to monolithic die SoC devices, without compromising the ability to optimize the process for both power and performance, whereas current high voltage requirements may limit monolithic SoCs. For example, a saving of 5-6 mw in connected standby power may be achieved.

Figure 3:
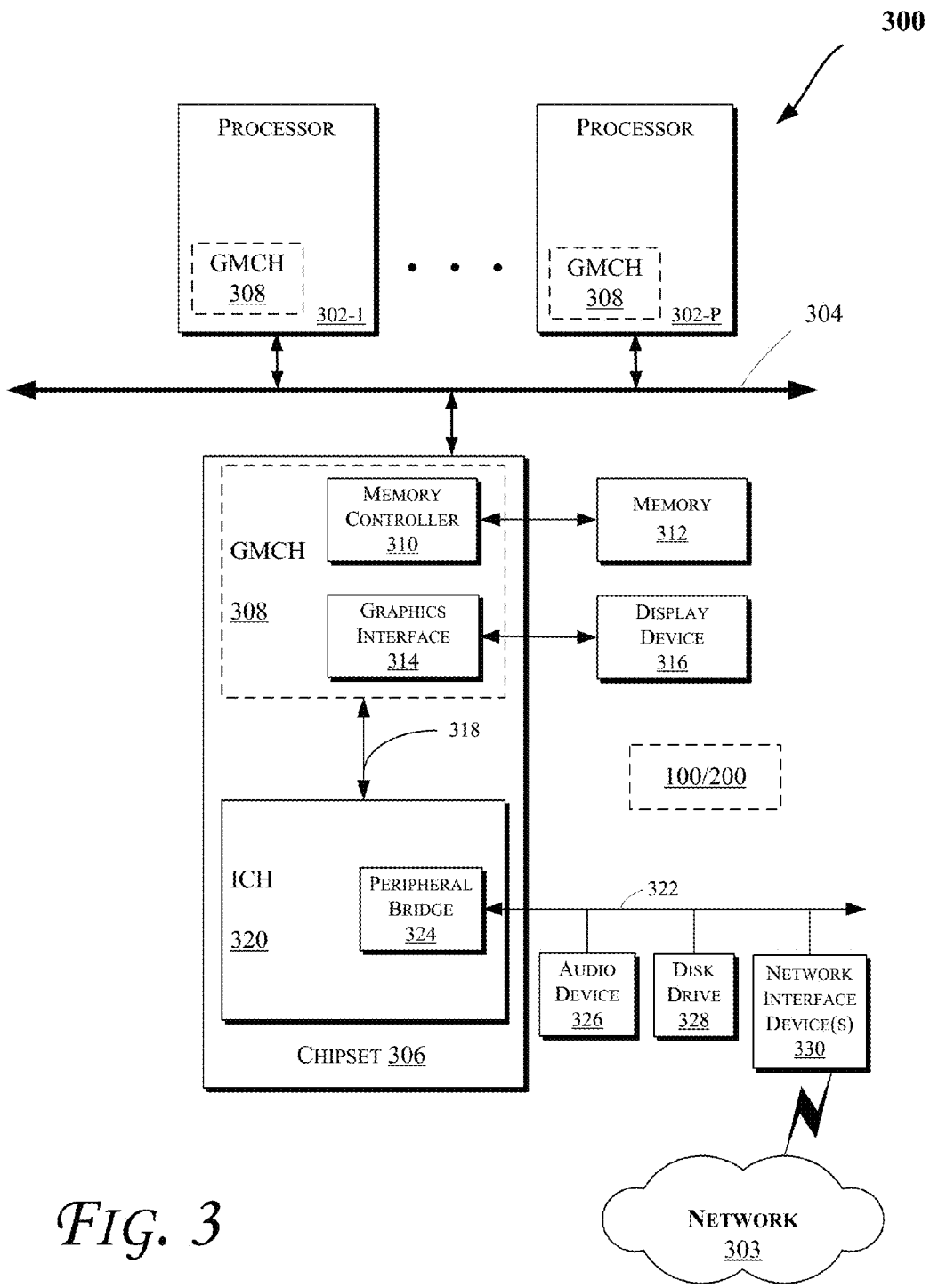
FIGS. 3-5 illustrate block diagrams of components of computing systems, which may be utilized to implement various embodiments discussed herein.

FIG. 3 illustrates a block diagram of a computing system 300 in accordance with an embodiment. The computing system 300 may include one or more central processing unit(s) (CPUs) or processors 302-1 through 302-P (which may be referred to herein as "processors 302" or "processor 302"). The processors 302 may communicate via an interconnection network (or bus) 304. The processors 302 may include a general purpose processor, a network processor (that processes data communicated over a computer network 303), or other types of a processor (including a reduced instruction set computer (RISC) processor or a complex instruction set computer (CISC)).

Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors. In some embodiments, device 100 and/or circuitry 200 may provide translated voltage levels to components of system 300. Also, the operations discussed with reference to FIGS. 1-2 may be performed by one or more components of the system 300.

A chipset 306 may also communicate with the interconnection network 304. The chipset 306 may include a graphics and memory control hub (GMCH) 308. The GMCH 308 may include a memory controller 310 that communicates with a memory 312. The memory 312 may store data, including sequences of instructions that are executed by the processor 302, or any other device included in the computing system 300. In one embodiment, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The GMCH 308 may also include a graphics interface 314 that communicates with a display device 316. In one embodiment, the graphics interface 314 may communicate with the display device 316 via an accelerated graphics port (AGP) or Peripheral Component Interconnect (PCI) (or PCI express (PCIe) interface). In an embodiment, the display device 316 (such as a flat panel display, a cathode ray tube (CRT), a projection screen, etc.) may communicate with the graphics interface 314 through, for example, a signal converter that translates a digital representation of an image stored in a storage device such as video memory or system memory into display signals that are interpreted and displayed by the display device 316. The display signals produced may pass through various control devices before being interpreted by and subsequently displayed on the display device 316.

A hub interface 318 may allow the GMCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the processor 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and one or more network interface device(s) 330 (which is in communication with the computer network 303). Other devices may communicate via the bus 322. Also, various components (such as the network interface device 330) may communicate with the GMCH 308 in some embodiments. In addition, the processor 302 and the GMCH 308 may be combined to form a single chip. Furthermore, a graphics accelerator (e.g., AGP and/or PCI/PCIe graphics device) may be included within the GMCH 308 in other embodiments.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 300 may be arranged in a point-to-point (PtP) configuration. For example, processors, memory, and/or input/output devices may be interconnected by a number of point-to-point interfaces.

Figure 4:
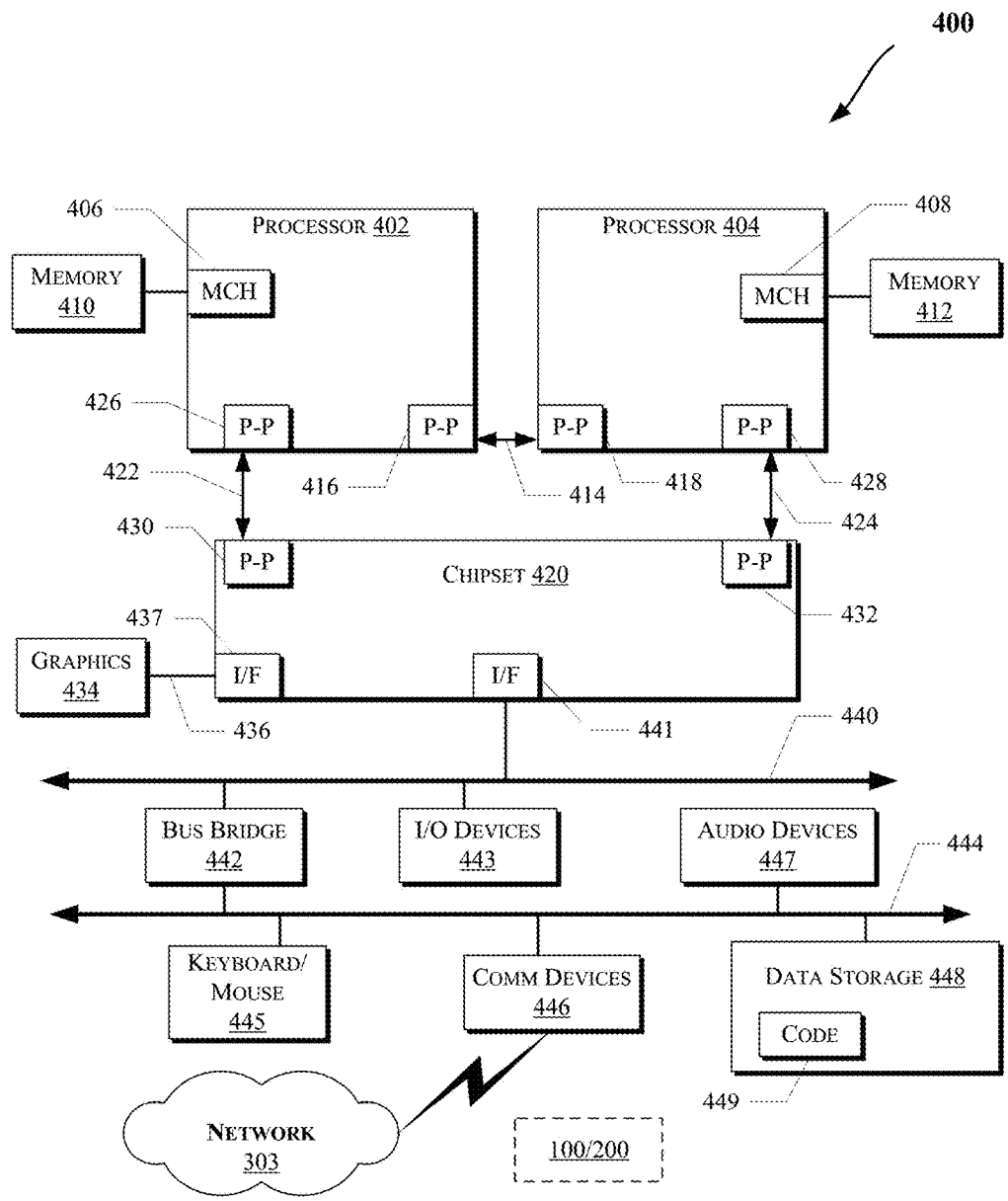

FIG. 4 illustrates a computing system 400 that is arranged in a point-to-point (PtP) configuration, according to an embodiment. In particular, FIG. 4 shows a system where processors, memory, and input/output devices are interconnected by a number of point-to-point interfaces. The operations discussed with reference to FIGS. 1-3 may be performed by one or more components of the system 400. For example, device 100 and/or circuitry 200 may provide translated voltage levels to components of system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 312 of FIG. 3.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a high-performance graphics circuit 434 via a high-performance graphics interface 436, e.g., using a PtP interface circuit 437.

In at least one embodiment, one or more operations discussed with reference to FIGS. 1-4 may be performed by the processors 402 or 404 and/or other components of the system 400 such as those communicating via a bus 440. Other embodiments, however, may exist in other circuits, logic units, or devices within the system 400 of FIG. 4. Furthermore, some embodiments may be distributed throughout several circuits, logic units, or devices illustrated in FIG. 4.

Chipset 420 may communicate with the bus 440 using a PtP interface circuit 441. The bus 440 may have one or more devices that communicate with it, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303), audio I/O device, and/or a data storage device 448. The data storage device 448 may store code 449 that may be executed by the processors 402 and/or 404.

In some embodiments, one or more of the components discussed herein can be embodied as a System On Chip (SOC) device. FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

Figure 5:
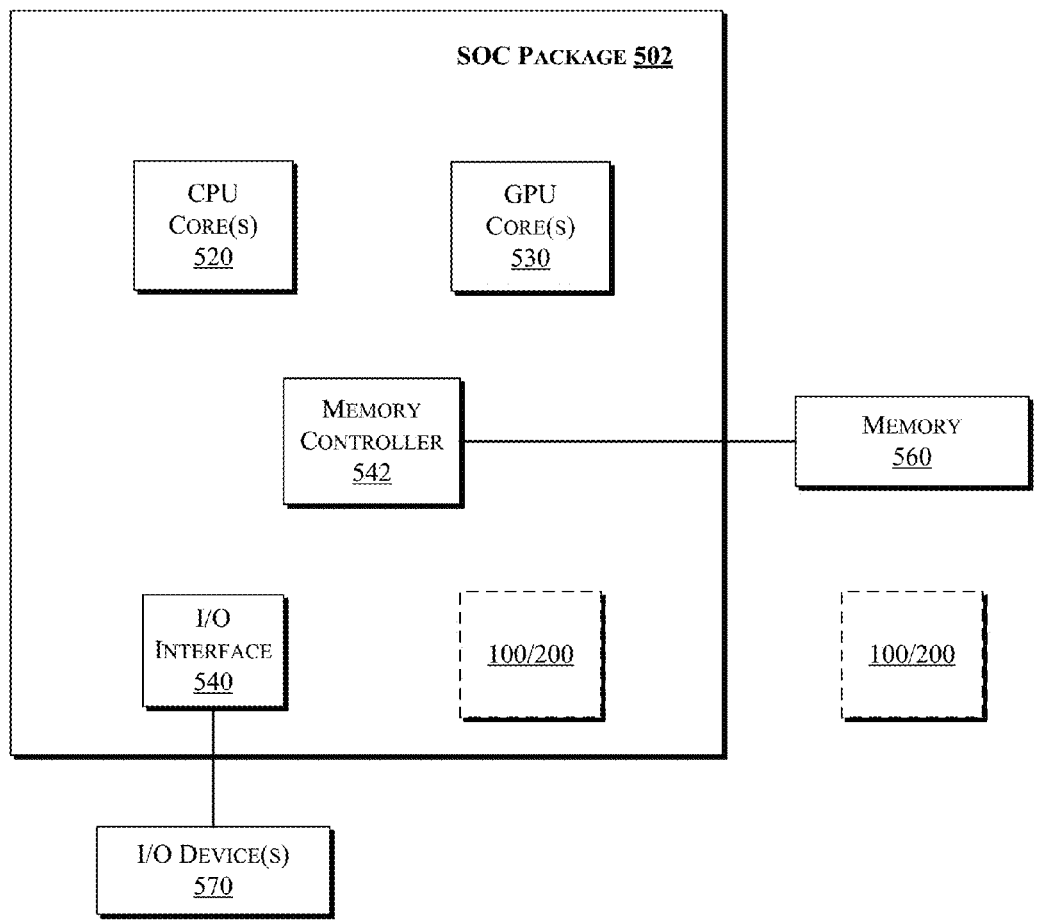

As illustrated in FIG. 5, SOC package 502 is coupled to a memory 560 (which may be similar to or the same as memory discussed herein with reference to the other figures) via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like. Furthermore, SOC package 502 may include/integrate the device/logic 100 and/or 200 in some embodiments. Alternatively, the device/logic 100 and/or 200 may be provided outside of the SOC package 502 (i.e., as a discrete logic).

The following examples pertain to further embodiments. Example 1 includes 1 includes an apparatus comprising: logic, at least a portion of which is in hardware, to translate an input voltage level into a plurality of output voltage levels during a low power consumption state of a device, wherein the logic is to comprise one or more registers to store one or more parameters, wherein, during the low power consumption state, data stored in the one or more registers are to be retained. Example 2 includes the apparatus of example 1, wherein the logic is to be disabled in response to detection of no connection to the logic. Example 3 includes the apparatus of example 1, wherein the one or more parameters correspond to one or more of: input/output voltage levels, passive or active pull-up output drive capability, adjustable threshold limits for detection of input, or enable or low power mode signal that causes a corresponding logic block to enter a low power mode or sleep mode. Example 4 includes the apparatus of example 1, wherein the plurality of output voltage levels are greater than about 1.8V. Example 5 includes the apparatus of example 1, wherein a shared bus is to couple the logic to other logic, wherein the other logic is capable to translate the input voltage level into one or more other output voltage levels. Example 6 includes the apparatus of example 1, wherein the low power consumption state is one of a sleep state or a connected standby state. Example 7 includes the apparatus of example 1, wherein the logic is to comprise circuitry to support one or more of: programmed logic high or low voltage values, programmable push/pull or passive pull up voltage options, or programmable voltage levels. Example 8 includes the apparatus of example 1, wherein one or more of: the logic, a processor, and memory are on a single integrated circuit.

Example 9 includes a method comprising: translating an input voltage level into a plurality of output voltage levels during a low power consumption state of a device, wherein one or more registers store one or more parameters, wherein, during the low power consumption state, data stored in the one or more registers is retained. Example 10 includes the method of example 9, further comprising disabling logic that is to perform the translating in response to detection of no connection to the logic. Example 11 includes the method of example 9, wherein the one or more parameters correspond to one or more of: input/output voltage levels, passive or active pull-up output drive capability, adjustable threshold limits for detection of input, or enable or low power mode signal that causes a corresponding logic block to enter a low power mode or sleep mode. Example 12 includes the method of example 9, wherein the plurality of output voltage levels are greater than about 1.8V. Example 13 includes the method of example 9, wherein the low power consumption state is one of a sleep state or a connected standby state.

Example 14 includes a system comprising: a processor having one or more processor cores; and logic, at least a portion of which is in hardware, to translate an input voltage level into a plurality of output voltage levels during a low power consumption state of a device, wherein the logic is to comprise one or more registers to store one or more parameters, wherein, during the low power consumption state, data stored in the one or more registers are to be retained. Example 15 includes the system of example 14, wherein the logic is to be disabled in response to detection of no connection to the logic. Example 16 includes the system of example 14, wherein the one or more parameters correspond to one or more of: input/output voltage levels, passive or active pull-up output drive capability, adjustable threshold limits for detection of input, or enable or low power mode signal that causes a corresponding logic block to enter a low power mode or sleep mode. Example 17 includes the system of example 14, wherein the plurality of output voltage levels are greater than about 1.8V. Example 18 includes the system of example 14, wherein a shared bus is to couple the logic to other logic, wherein the other logic is capable to translate the input voltage level into one or more other output voltage levels. Example 19 includes the system of example 14, wherein the low power consumption state is one of a sleep state or a connected standby state. Example 20 includes the system of example 14, wherein the logic is to comprise circuitry to support one or more of: programmed logic high or low voltage values, programmable push/pull or passive pull up voltage options, or programmable voltage levels. Example 21 includes the system of example 14, wherein one or more of: the logic, the processor, and memory are on a single integrated circuit. Example 22 includes the system of example 14, further comprising a display device, coupled to the processor, to display an image.

Example 23 includes a computer-readable medium comprising one or more instructions that when executed on a processor configure the processor to perform one or more operations of any one of examples 9 to 13.

Example 24 includes an apparatus comprising means to perform a method as set forth in any one of examples 9 to 13.

Example 25 includes an apparatus comprising means to perform a method as set forth in any preceding example.

Example 26 includes a machine-readable storage including machine-readable instructions, when executed, to implement a method or realize an apparatus as set forth in any preceding claim.

In various embodiments, the operations discussed herein, e.g., with reference to FIGS. 1-5, may be implemented as hardware (e.g., logic circuitry), software, firmware, or combinations thereof, which may be provided as a computer program product, for example, including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-5.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, at least a portion of which is in hardware, to translate an input voltage level into a plurality of output voltage levels during a low power consumption state of a device, wherein the logic is to comprise one or more registers to store one or more parameters, wherein, during the low power consumption state, data stored in the one or more registers are to be retained,
   wherein the one or more parameters correspond to adjustable threshold limits for detection of input, wherein the logic is to comprise circuitry to support one or more of: programmable push/pull or passive pull up voltage options or programmable voltage levels.

2. The apparatus of claim 1, wherein the logic is to be disabled in response to detection of no connection to the logic.

3. The apparatus of claim 1, wherein the one or more parameters further correspond to input/output voltage levels.

4. The apparatus of claim 1, wherein the plurality of output voltage levels are greater than 1.8V.

5. The apparatus of claim 1, wherein a shared bus is to couple the logic to other logic, wherein the other logic is capable to translate the input voltage level into one or more other output voltage levels.

6. The apparatus of claim 1, wherein the low power consumption state is one of a sleep state or a connected standby state.

7. The apparatus of claim 1, wherein the logic is to comprise circuitry to support programmed logic high or low voltage values.

8. The apparatus of claim 1, wherein one or more of: the logic, a processor, and memory are on a single integrated circuit.

9. The apparatus of claim 1, wherein the one or more parameters correspond to passive or active pull-up output drive capability.

10. The apparatus of claim 1, wherein the one or more parameters correspond to an enable signal or low power mode signal that causes a corresponding logic block to enter a low power mode or sleep mode.

11. A method comprising:
    translating, at a logic, an input voltage level into a plurality of output voltage levels during a low power consumption state of a device, wherein one or more registers store one or more parameters, wherein, during the low power consumption state, data stored in the one or more registers is retained,
    wherein the one or more parameters correspond to adjustable threshold limits for detection of input, wherein the logic supports one or more of: programmable push/pull or passive pull up voltage options or programmable voltage levels.

12. The method of claim 11, further comprising disabling logic that is to perform the translating in response to detection of no connection to the logic.

13. The method of claim 11, wherein the one or more parameters further correspond to input/output voltage levels.

14. The method of claim 11, wherein the plurality of output voltage levels are greater than 1.8V.

15. The method of claim 11, wherein the low power consumption state is one of a sleep state or a connected standby state.

16. A system comprising:
    a processor having one or more processor cores; and
    logic, at least a portion of which is in hardware, to translate an input voltage level into a plurality of output voltage levels during a low power consumption state of a device, wherein the logic is to comprise one or more registers to store one or more parameters, wherein, during the low power consumption state, data stored in the one or more registers are to be retained,
    wherein the one or more parameters correspond to adjustable threshold limits for detection of input, wherein the logic is to comprise circuitry to support one or more of: programmable push/pull or passive pull up voltage options or programmable voltage levels.

17. The system of claim 16, wherein the logic is to be disabled in response to detection of no connection to the logic.

18. The system of claim 16, wherein the one or more parameters further correspond to input/output voltage levels.

19. The system of claim 16, wherein the plurality of output voltage levels are greater than 1.8V.

20. The system of claim 16, wherein a shared bus is to couple the logic to other logic, wherein the other logic is capable to translate the input voltage level into one or more other output voltage levels.

21. The system of claim 16, wherein the low power consumption state is one of a sleep state or a connected standby state.

22. The system of claim 16, wherein the logic is to comprise circuitry to support programmed logic high or low voltage values.

23. The system of claim 16, wherein one or more of: the logic, the processor, and memory are on a single integrated circuit.

24. The system of claim 16, further comprising a display device, coupled to the processor, to display an image.

* * * * *